Nov. 17, 1953  A. HURST  2,659,270
SPECTACLE TEMPLE
Filed June 28, 1950
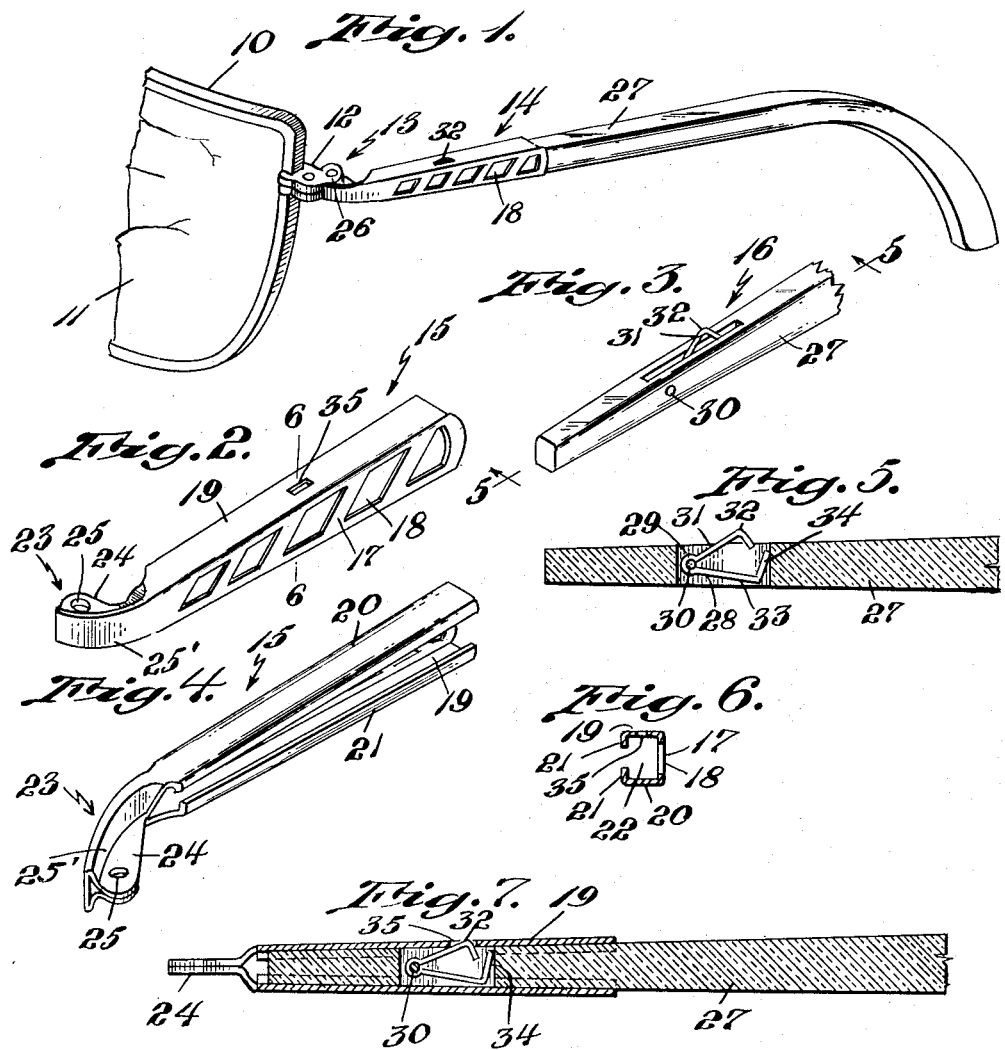
INVENTOR.
Alonzo Hurst
BY
Barlow & Barlow
ATTORNEYS.

Patented Nov. 17, 1953

2,659,270

UNITED STATES PATENT OFFICE 2,659,270

SPECTACLE TEMPLE

Alonzo Hurst, Providence, R. I.

Application June 28, 1950, Serial No. 170,765

2 Claims. (Cl. 88—52)

1

This invention relates to a spectacle temple.

Heretofore it has been usual if a different spectacle temple were desired upon a spectacle to change the entire temple at its hinge connection and although in some cases spectacle temples were made by assembling two different parts, these parts were so assembled that it was not the intent of the assembler that they should be disassembled except at the factory where made and one part interchanged with a similar part.

One of the objects of this invention is to provide a spectacle temple which is formed of two sections so that one of the sections may be detached from the other and interchanged with another section, such, for instance, as a section of different color.

Another object of this invention is to provide a spectacle which may have a plurality of temples of different colors with an arrangement so that the temple of one color may be disassembled and a temple of another color put in its place, with an arrangement so that the change may be easily made any time desired by the owner; thus, it may provide an arrangement so that the spectacle temple may match the color scheme of the dress of the wearer.

Another object of this invention is to provide an arrangement so that a section of the spectacle temple may be interchanged with another section by a very simple operation.

Another object of this invention is to provide a recess in one section of the temple and a detent in another, so that by mere pressure of the detent the section carrying the detent may be released and removed and another section which is just like the one removed may be substituted therefor.

With these and other objects in view, the invention consists of certain novel features of construction, as will be more fully described and particularly pointed out in the appended claims.

In the accompanying drawings:

Figure 1 is a perspective view of a fragmental portion of an eyeglass frame with a spectacle temple of my invention attached thereto;

Figure 2 is a perspective view of one section of the temple;

Figure 3 is a perspective view of a fragmental portion of another section of the temple;

Figure 4 is a perspective view of the opposite side of the section shown in Figure 2;

Figure 5 is a sectional view on substantially line 5—5 of Figure 3;

Figure 6 is a sectional view on line 6—6 of Figure 2; and

2

Figure 7 is a sectional view showing the assembly of the structures of Figures 2 and 3.

In proceeding with this invention, I have provided a temple which is formed of two sections, one of the sections being hinged to the eyeglass frame and the other section is such as to telescope into the first section and form an extension thereof and be locked thereto by some sort of a releasable latch.

With reference to the drawings, 10 designates an eye-glass frame having a lens 11 mounted therein and provided with an end piece 12 which provides a hinged connection designated generally 13 for a temple which is designated generally 14 and comprises a section 15, as shown in Figure 2, with a hinge at one end and a section 16, as shown in Figure 3, which may be telescoped into the section 15 and held therein.

The section 15 is conveniently formed of metal which is bent up into a generally channel-shaped construction having an outer wall 17 perforated as at 18 and a top wall 19 and bottom wall 20, each of which is provided with flanges 21 extending inwardly toward each other, thus leaving a hollow portion 22 extending lengthwise thereof. One end 23 is provided with a web portion 24 having an opening 25 to receive the hinge pin 26 for attaching it to the end piece 12 while adjacent to the web a lip 27 covers the outer edge of the end piece and provides a stop by engagement therewith.

The other section 16 is formed generally of solid stock 27 of a tapered shape corresponding to the shape of the hollow portion 22 of the section 15, so as to fit snugly therein, as shown in Figure 7. A recess 28 extends laterally through the stock 27 and has located therein a wire bent, as shown in Figure 5, to provide an eye 29 to receive a pin 30 and hold it in the recess 28, while one leg 31 has a knee 32 and the other leg 33 is turned upwardly as at 34 to engage the end of the slot 28. The knee 32 fits within an opening or recess 35 provided in the wall 19 of the section 15 so as to lock therewith and prevent movement outwardly of the section 27.

This section 27 is made of celluloid or some organic plastic material which may be colored and several of these temples will be provided of different colors to be sold with each spectacle frame so that the owner may interchange these sections to match the dress, if desired, by merely forcing inwardly the knee 32 and withdrawing the section 27 and replacing it with another.

I claim:

1. A temple comprising two rigid sections, one of said sections having an axially extending recess opening through its end and the end portion of the other section snugly fitting in said recess and slidably removably related thereto, and means carried by each of said sections to prevent accidental separation of the sections, said means comprising a hole in one section located along said recess and a resilient bowed detent having an arched portion carried by the other section and located so that the arched portion will enter said hole and engage the edge thereof when the sections are in assembled relation.

2. A temple comprising two rigid sections, one of said sections having an axially extending recess opening through its end and the end portion of the other section snugly fitting in said recess and slidably removably related thereto, and means carried by each of said sections to prevent accidental separation of the sections, said means comprising a hole through the wall of one section located along the longitudinal extent defined by said recess and a member carried by the other section having a pair of resilient arms, one of which provides a smooth cam surface, said cam surface located so as to enter said hole and engage the edge thereof when the sections are in assembled relation, the other arm of said member engaging an opposite wall of the recess to yieldingly urge the cam arm into said hole while permitting the sections to be pulled apart.

ALONZO HURST.

References Cited in the file of this patent
UNITED STATES PATENTS

| Number | Name | Date |
|---|---|---|
| 27,359 | Gordon | Mar. 6, 1860 |
| 1,591,181 | Pollmiller | July 6, 1926 |
| 1,910,743 | Bouchard | May 23, 1933 |
| 2,443,249 | Jackson | June 15, 1948 |
| 2,482,195 | Martin | Sept. 20, 1949 |
| 2,495,508 | Cleaver | Jan. 24, 1950 |

FOREIGN PATENTS

| Number | Country | Date |
|---|---|---|
| 67,169 | Germany | Feb. 16, 1893 |
| 303,716 | Great Britain | Jan. 10, 1929 |
| 466,034 | Great Britain | May 20, 1937 |